United States Patent
Jung

(10) Patent No.: US 9,800,107 B2
(45) Date of Patent: Oct. 24, 2017

(54) ROTOR

(71) Applicant: HYUNDAI MOBIS CO., LTD., Seoul (KR)

(72) Inventor: Jae Woo Jung, Daegu (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 262 days.

(21) Appl. No.: 14/707,996

(22) Filed: May 8, 2015

(65) Prior Publication Data

US 2016/0111927 A1   Apr. 21, 2016

(30) Foreign Application Priority Data

Oct. 20, 2014  (KR) .......................... 10-2014-0141930

(51) Int. Cl.
*H02K 1/27*  (2006.01)
*H02K 1/28*  (2006.01)

(52) U.S. Cl.
CPC ............. *H02K 1/2773* (2013.01); *H02K 1/28* (2013.01)

(58) Field of Classification Search
CPC ............................... H02K 1/2773; H02K 1/28
See application file for complete search history.

(56) References Cited

U.S. PATENT DOCUMENTS

| | | | | |
|---|---|---|---|---|
| 3,271,604 A | * | 9/1966 | Priddy | H01R 39/34 174/151 |
| 3,603,825 A | * | 9/1971 | Sheridan | H02K 13/02 310/194 |
| 4,105,907 A | * | 8/1978 | Hagenlocher | H01R 39/34 310/232 |
| 4,377,762 A | * | 3/1983 | Tatsumi | H02K 1/28 29/520 |
| 4,469,970 A | * | 9/1984 | Neumann | H02K 1/276 310/156.78 |
| 4,658,167 A | * | 4/1987 | Popov | H02K 1/2773 310/156.55 |
| 5,463,262 A | * | 10/1995 | Uchida | H02K 1/2773 310/156.55 |

(Continued)

FOREIGN PATENT DOCUMENTS

| | | |
|---|---|---|
| KR | 10-0225193 B1 | 10/1999 |
| KR | 10-2012-0110275 A | 10/2012 |
| KR | 10-2014-0018779 A | 2/2014 |

OTHER PUBLICATIONS

Office Action dated Sep. 22, 2015 of corresponding Korean Patent Application No. 10-2014-0141930—5 pages.

(Continued)

*Primary Examiner* — Robert W Horn
(74) *Attorney, Agent, or Firm* — Knobbe Martens Olson & Bear LLP

(57) ABSTRACT

A rotor may include: a shaft; a rotor core assembly including a plurality of slits formed in a radial manner, a magnet housing part formed between the respective slits, and a plurality of rotor cores having different structures depending on whether bridges for closing inner and outer diameter parts of the magnet housing part are formed, wherein the rotor core assembly is formed by stacking the plurality of rotor cores coupled to the shaft; a magnet inserted into each of the magnet housing parts; and a fastening member connecting the rotor cores through the rotor cores.

9 Claims, 17 Drawing Sheets

(56) References Cited

U.S. PATENT DOCUMENTS

| | | | | |
|---|---|---|---|---|
| 5,786,650 A * | 7/1998 | Uchida | | H02K 1/2773 |
| | | | | 310/156.55 |
| 5,829,120 A * | 11/1998 | Uchida | | H02K 1/2773 |
| | | | | 29/598 |
| 6,265,802 B1 * | 7/2001 | Getschmann | | H02K 1/28 |
| | | | | 310/156.34 |
| 6,396,188 B1 * | 5/2002 | Kliman | | H02K 3/20 |
| | | | | 310/261.1 |
| 6,674,213 B2 * | 1/2004 | Berger | | H02K 3/487 |
| | | | | 310/216.053 |
| 6,703,741 B1 * | 3/2004 | Ifrim | | H02K 1/2773 |
| | | | | 310/156.19 |
| 7,479,723 B2 * | 1/2009 | Dawsey | | H02K 1/2766 |
| | | | | 310/156.57 |
| 7,800,272 B2 * | 9/2010 | Nakayama | | H02K 1/2766 |
| | | | | 310/156.56 |
| 8,080,907 B2 * | 12/2011 | Jeung | | H02K 1/2733 |
| | | | | 310/156.08 |
| 8,519,588 B2 * | 8/2013 | Amrhein | | H02K 1/276 |
| | | | | 310/156.56 |
| 8,535,030 B2 * | 9/2013 | Chua | | F04C 2/084 |
| | | | | 418/136 |
| 8,757,337 B2 * | 6/2014 | Kojima | | F16F 9/145 |
| | | | | 188/290 |
| 9,099,905 B2 * | 8/2015 | Manz | | H02K 1/2773 |
| 9,325,209 B2 * | 4/2016 | Kojima | | H02K 1/28 |
| 9,362,792 B2 * | 6/2016 | Figgins | | H02K 1/28 |
| 9,369,013 B2 * | 6/2016 | Jang | | H02K 1/27 |
| 2007/0252469 A1 * | 11/2007 | Nishiura | | H02K 1/2773 |
| | | | | 310/156.56 |
| 2008/0296990 A1 * | 12/2008 | Evans | | H02K 1/276 |
| | | | | 310/156.56 |
| 2009/0096308 A1 | 4/2009 | Staudenmann | | |
| 2012/0038237 A1 * | 2/2012 | Li | | H02K 1/146 |
| | | | | 310/156.45 |
| 2014/0103772 A1 * | 4/2014 | Kingrey | | H02K 15/03 |
| | | | | 310/156.15 |
| 2015/0022042 A1 * | 1/2015 | Han | | H02K 1/2773 |
| | | | | 310/156.23 |
| 2015/0028710 A1 * | 1/2015 | Oka | | H02K 1/2773 |
| | | | | 310/156.48 |
| 2016/0099629 A1 * | 4/2016 | Akashi | | H02K 1/2773 |
| | | | | 310/51 |
| 2016/0105059 A1 * | 4/2016 | El Baraka | | H02K 1/2773 |
| | | | | 310/156.01 |
| 2016/0111927 A1 * | 4/2016 | Jung | | H02K 1/28 |
| | | | | 310/156.14 |
| 2016/0118848 A1 * | 4/2016 | Raminosoa | | H02K 1/02 |
| | | | | 310/154.01 |
| 2016/0164356 A1 * | 6/2016 | Sakurai | | H02K 1/28 |
| | | | | 310/156.13 |
| 2016/0261152 A1 * | 9/2016 | Akashi | | H02K 1/22 |

OTHER PUBLICATIONS

Office Action dated Mar. 24, 2016 of corresponding Korean Patent Application No. 10-2014-0141930—3 pages.

\* cited by examiner

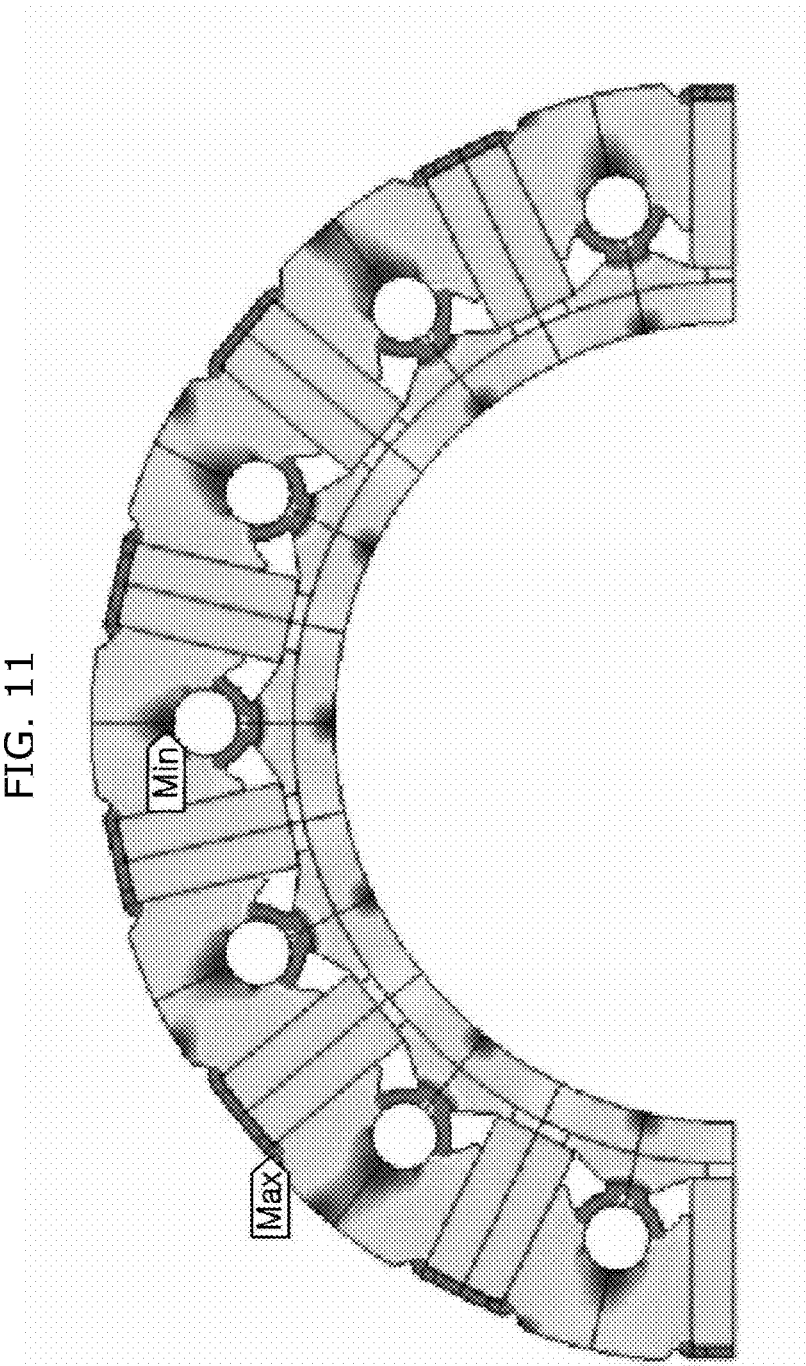

ROTOR

CROSS-REFERENCES TO RELATED APPLICATIONS

The present application claims priority to Korean application number 10-2014-0141930, filed on Oct. 20, 2014, which is incorporated by reference in its entirety.

BACKGROUND

The present disclosure relates to a rotor, and more particular, to a rotor which improves an output density by minimizing a leakage flux in the rotor used in a spoke type motor having permanent magnets.

In general, a spoke type motor includes a rotor having a plurality of permanent magnets and a stator arranged to surround the outside of the rotor and having a plurality of slots around which a coil is wound. The permanent magnets of the rotor are radially arranged around the axis of rotation (shaft). The rotor forms a magnetic flux path while supporting the permanent magnets. In the rotor, a magnetic leakage through a leakage flux path serves as a main factor which reduces the output density of the motor.

The related technology is disclosed in Korean Patent Laid-open Publication No. 2012-0110275 published on Oct. 10, 2012 and entitled "Spoke type permanent magnet motor".

SUMMARY

Embodiments of the present invention are directed to a rotor which is capable of minimizing a leakage flux in the rotor of a spoke type permanent magnet motor, preventing permanent magnets from flying apart during high-speed rotation, and preventing slips between a shaft and rotor cores when the motor is driven at the maximum torque.

In one embodiment, a rotor may include: a shaft; a rotor core assembly including a plurality of slits formed in a radial manner, a magnet housing part formed between the respective slits, and a plurality of rotor cores having different structures depending on whether bridges for closing inner and outer diameter parts of the magnet housing part are formed, wherein the rotor core assembly is formed by stacking the plurality of rotor cores coupled to the shaft; a magnet inserted into each of the magnet housing parts; and a fastening member connecting the rotor cores through the rotor cores.

The rotor core assembly may include: a first rotor core having bridges formed at the inner and outer diameter parts of the magnet housing part, respectively; a second rotor core having a bridge formed at the inner diameter part of the magnet housing part; and a third rotor core having no bridges formed at the inner and outer diameter parts of the magnet housing part.

The first rotor may be is arranged at the center, top, and bottom of the shaft. The second rotor core may be arranged between the first rotor core arranged at the center of the shaft and the first rotor core arranged at the top of the shaft, and arranged between the first rotor core arranged at the center of the shaft and the first rotor core arranged at the bottom of the shaft. The third rotor core may be arranged between the first rotor core arranged at the center of the shaft and the second rotor core arranged over the first rotor core, and arranged between the first rotor core arranged at the center of the shaft and the second rotor core arranged under the first rotor core.

The third rotor core may have a larger thickness than the second rotor core, and the second rotor core may have a larger thickness than the first rotor core.

The shaft may have serration parts formed on the outer circumferential surface thereof along the longitudinal direction thereof.

The serration parts may be formed to face the respective slits of the first to third rotor cores.

The fastening member may include a non-magnetic material.

Both ends of the fastening member may be rivet-fastened.

The shaft may include a ferromagnetic material.

The first rotor core may be arranged at the center, top, and bottom of the shaft. The pair of second rotor cores may be arranged to be separated from each other between the first rotor core arranged at the center of the shaft and the first rotor core arranged at the top of the shaft, and arranged to be separated from each other between the first rotor core arranged at the center of the shaft and the first rotor core arranged at the bottom of the shaft. The third rotor core may be arranged between the pair of second rotor cores arranged at the top of the shaft, and arranged between the pair of the second rotor cores arranged at the bottom of the shaft.

The third rotor core may have a larger thickness than the second rotor core, and the second rotor core may have a larger thickness than the first rotor core.

The second rotor core arranged at the center of the shaft may have a smaller thickness than the second rotor core arranged at the top or bottom of the shaft.

The first and second rotor cores may have a leakage flux prevention part which is opened to both sides of the magnet housing part, facing the inner diameter part.

The second rotor core may have a magnet support part protruding from the outer diameter part thereof, the magnet support part preventing coming-off of the magnet.

The shaft may have serration parts formed on the outer circumferential surface thereof along the longitudinal direction thereof.

The serration parts may be formed to face the respective slits of the first to third rotor cores.

BRIEF DESCRIPTION OF THE DRAWINGS

FIG. 11 is a diagram illustrating magnetic flux saturation distributions of a first rotor core in accordance with the embodiment of the present invention.

DESCRIPTION OF EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Since the typical spoke type motor has a large quantity of leakage flux paths formed in the shaft direction, a large amount of magnetic leakage and loss may occur. When a slim and long magnetic bridge is installed to reduce a leakage flux, the magnetic bridge occupies a large space in the diameter direction of the rotor. Thus, there are difficulties in applying the magnetic bridge to the spoke type motor using ferrite permanent magnets and a motor including a hollow rotor. Thus, there is a demand for improvements in motor's structure.

Figure 1:
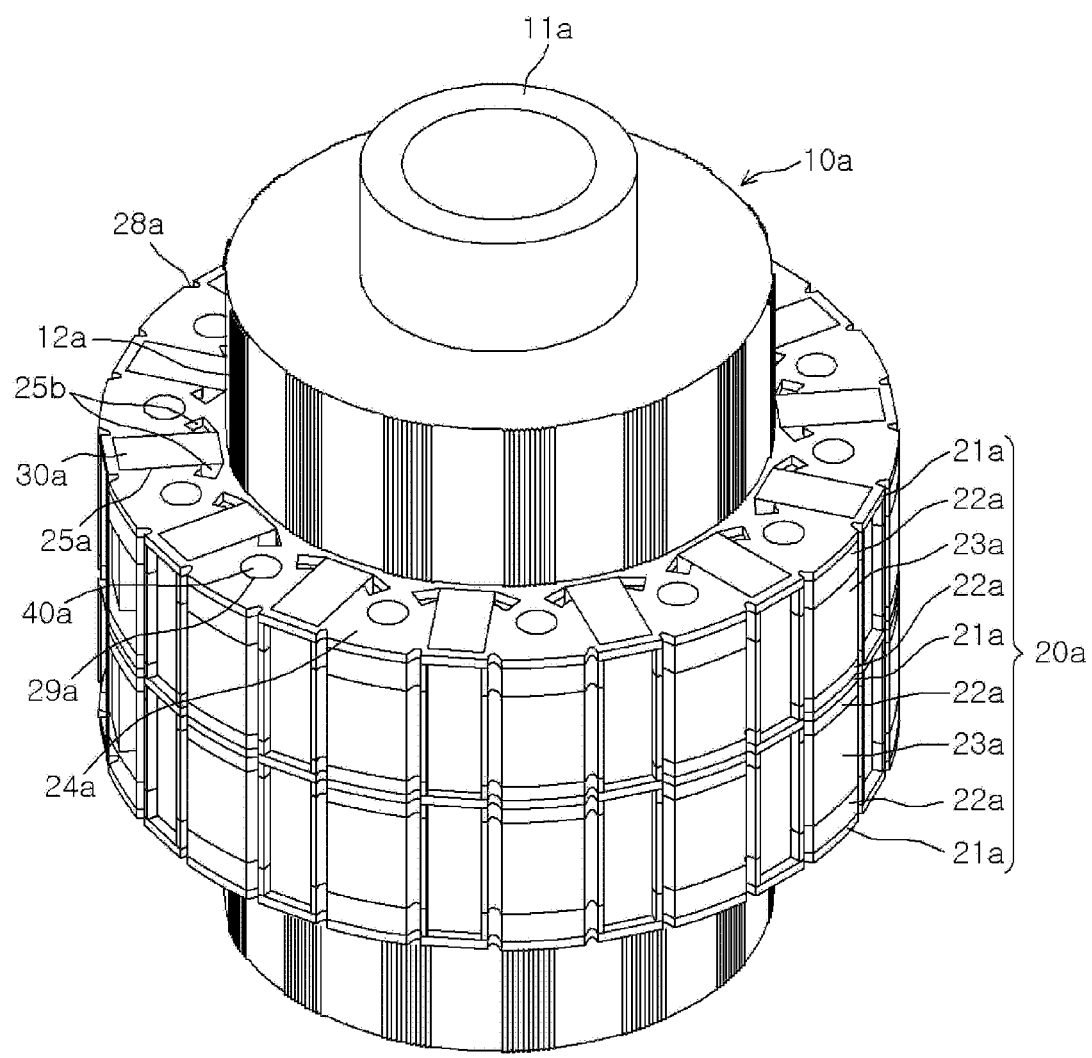
FIG. 1 is a schematic perspective view of a rotor in accordance with an embodiment of the present invention.
Figure 2:
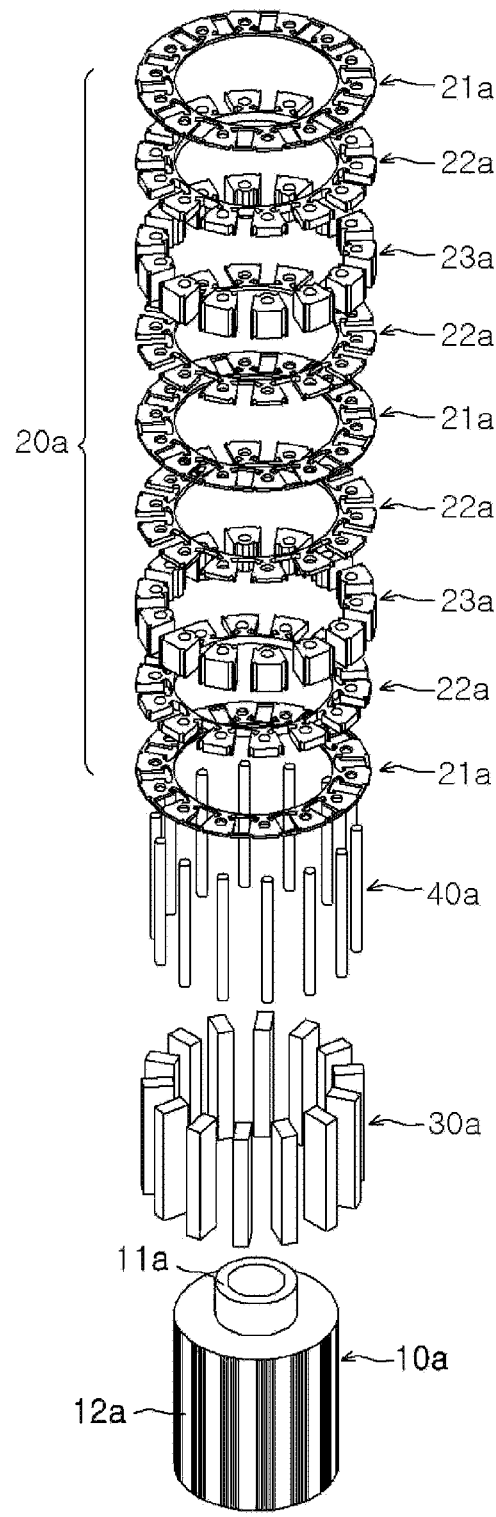
FIG. 2 is a schematic exploded perspective view of the rotor in accordance with the embodiment of the present invention.
Figure 3:
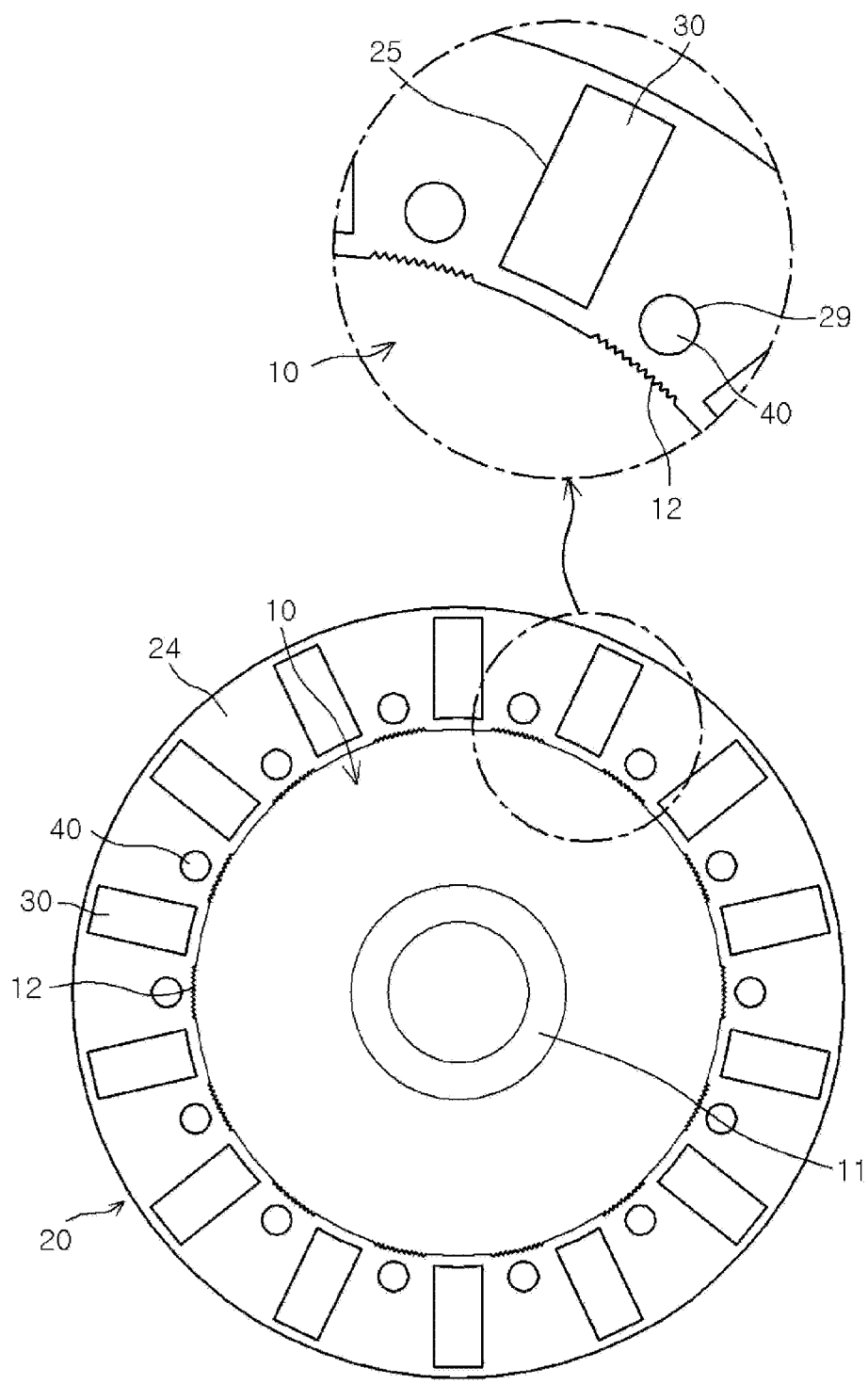
FIG. 3 is a schematic plan view of the rotor in accordance with the embodiment of the present invention.
Figure 4:
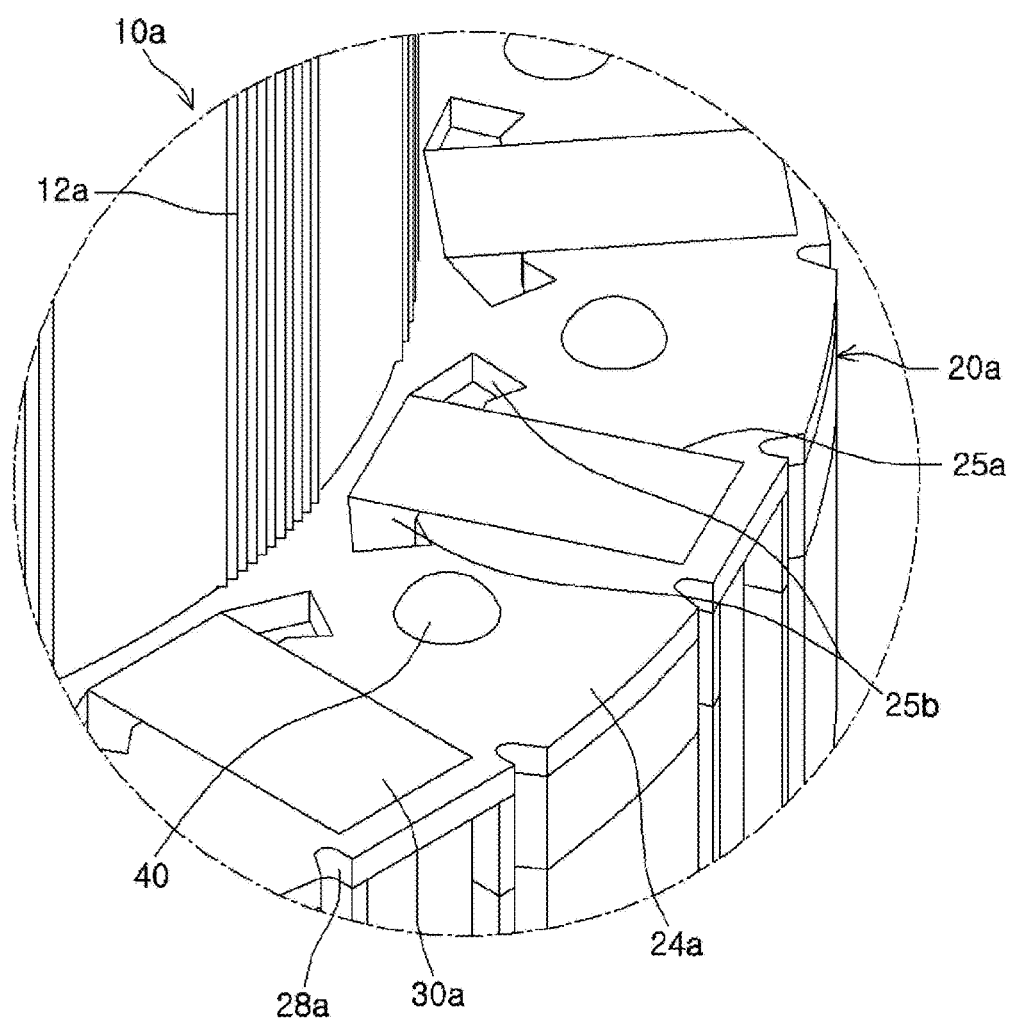
FIG. 4 is a partially expanded view illustrating that both ends of a fastening member are rivet-fastened in accordance with the embodiment of the present invention.
Figure 5A:
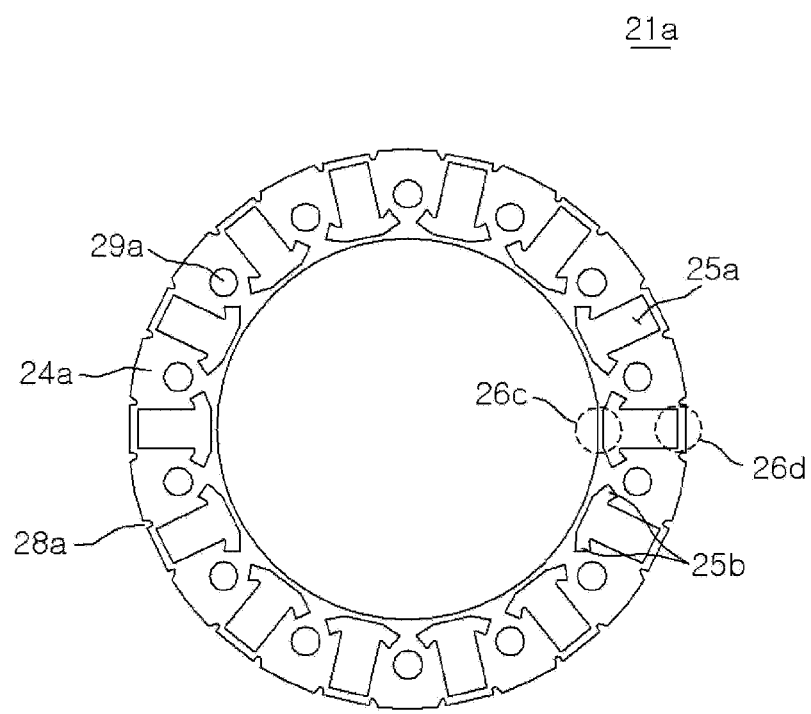
FIGS. 5A to 5C are schematic plan views of rotor cores in accordance with the embodiment of the present invention.
Figure 5B:
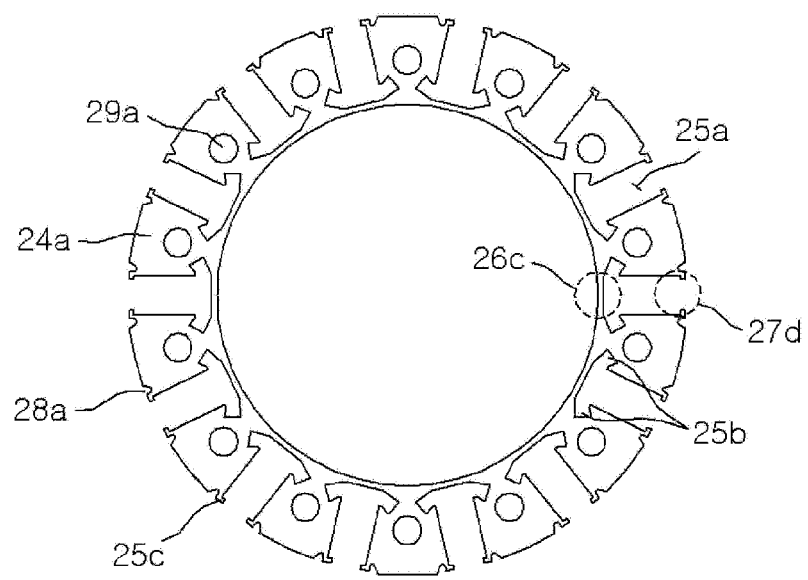
Figure 5C:
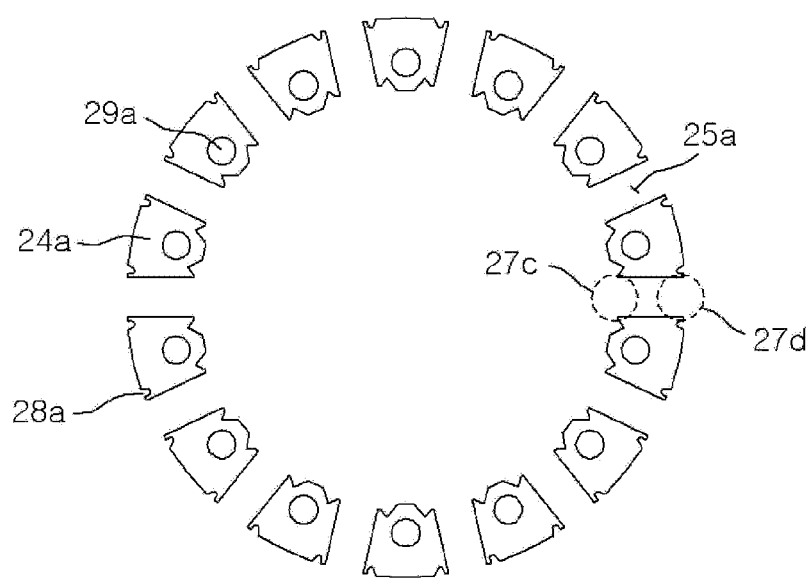

FIG. 1 is a schematic perspective view of a rotor in accordance with an embodiment of the present invention. FIG. 2 is a schematic exploded perspective view of the rotor in accordance with the embodiment of the present invention. FIG. 3 is a schematic plan view of the rotor in accordance with the embodiment of the present invention. FIG. 4 is a partially expanded view illustrating that both ends of a fastening member are rivet-fastened in accordance with the embodiment of the present invention. FIGS. 5A to 5C are schematic plan views of rotor cores in accordance with the embodiment of the present invention. FIGS. 6A to 6F are analysis diagrams illustrating a magnetic flux path when no load is applied to the rotor cores in accordance with the embodiment of the present invention.

Referring to FIGS. 1 and 2, the rotor in accordance with the embodiment of the present invention may include a shaft 10, a rotor core assembly 20, a magnet 30, and a fastening member 40.

The shaft 10 may be formed in a rod shape having a circular cross-section, and include a plurality of first to third rotor cores 21 to 23 coupled to the outer circumferential surface thereof. The shaft 10 may be rotated together with the first to third rotor cores 21 to 23. The shaft 10 may have a hollow rotating shaft 11 formed in the center thereof. Since the shaft 10 has the hollow rotating shaft 11 formed therein, a separate mechanical structure may be inserted into the shaft 10. The shaft 10 may include a non-magnetic material in order to have no influence on the magnetic force of the magnet 30. In the embodiment of the present invention, the shaft 10 may be formed of stainless steel or high manganese steel.

The rotor core assembly 20 may be forced onto the shaft 10, and include a plurality of rotor cores 21 to 23 stacked therein. Each of the rotor cores 21 to 23 may have a hole formed in the center thereof such that the shaft 10 can be inserted into the hole.

In the present embodiment, the rotor cores 21 to 23 may include a first rotor core 21, a second rotor core 22, and a third rotor core 23. Each of the first to third rotor cores 21 to 23 may include a plurality of slits 24 and a magnet housing part 25 formed between the respective slits 24 so as to provide a space for housing the magnet 30. The first to third rotor cores 21 to 23 may be formed in different shapes depending on whether bridges 26a and 26b for closing inner and outer-diameter parts of the magnet housing part 25 are formed. The plurality of first to third rotor cores 21 to 23 may be coupled to the shaft 10.

Referring to FIGS. 1 to 3, the shaft 10 may have a plurality of serration parts 12 formed at a predetermined interval on the outer circumferential surface thereof. The serration parts 12 may be formed through a serration process which is performed along the longitudinal direction of the shaft 10. The serration parts 12 formed on the outer circumferential surface of the shaft 10 may have a triangular serration cross-section. The first to third rotor cores 21 to 23 may be forced onto the shaft 10. The serration parts 12 may be formed to deviate from the positions at which the magnets are arranged in the first to third rotor cores 21 to 23. That is, the serration parts 12 may be formed to face the respective slits 24 of the first to third rotor cores 21 to 23, at which the magnets 30 are not arranged. This is in order to prevent the damage of the parts of the first to third rotor cores 21 to 23, at which the magnets 30 are arranged, due to the contact with the serration parts 12, when the first to third rotor cores 21 to 23 are forced onto the shaft 10.

When the serration parts 12 are formed on the outer circumferential surface of the shaft 10, the serration parts 12 may prevent the occurrence of slips between the first to third rotor cores 21 to 23 and the shaft 10, while the first to third rotor cores 21 to 23 are rotated at the maximum torque with the shaft 10. In the embodiment of the present invention, the serration parts 12 are formed on the outer circumferential surface of the shaft 10. However, the present invention is not limited thereto, but the serration parts 12 may be formed at the inner diameter parts of the respective rotor cores 21 to 23.

The magnet 30 may include a hexahedral permanent magnet. The magnet 30 may be inserted into the magnet housing part 25, and fixed to the magnet housing part 25 through bonding. The magnet 30 may include an alnico magnet, a ferrite magnet, a rare earth magnet, a Mn—Al—C magnet and the like. In the embodiment of the present invention, a rare earth magnet having a high energy density may be applied as the magnet 30.

Referring to FIGS. 1 and 2, the fastening members 40 may connect the first to third rotor cores 21 to 23 through through-holes 29 formed in the first to third rotor cores 21 to 23. Since the bridges 26a and 26b are not formed in the third rotor core 23, there is no part capable of connecting the entire third rotor core 23. Thus, the respective slits 24 of the third rotor core 23 may be separated from each other. The third rotor core 23 may be connected to the first and second rotor cores 21 and 22 through the fastening members 40 such that the first to third rotor cores 21 to 23 may be integrated with each other. The fastening member 40 may include a non-magnetic material in order to have no influence on the magnetic force of the magnet 30. In the embodiment of the present invention, the fastening member 40 may include stainless steel or high manganese steel.

Referring to FIG. 4, both ends of the fastening member 40 may be rivet-fastened to integrate the rotor core assembly 20 having the first to third rotor cores 21 to 23 stacked therein. Furthermore, the first to third rotor cores 21 to 23 stacked on the shaft 10 may be prevented from flying apart during rotation by the rivet-fastened fastening members 40.

Referring to FIGS. 2 to 5, the first to third rotor cores 21 to 23 will be described in more detail. FIG. 5A is a plan view of the first rotor core 21, FIG. 5B is a plan view of the second rotor core 22, and FIG. 5C is a plan view of the third rotor core 23.

The first rotor core 21 may have bridges 26a and 26b formed at the inner and outer diameter parts of the magnet housing part 25, the second rotor core 22 may have a bridge 26a formed at the inner diameter part of the magnet housing part 25, and the third rotor core 23 may have no bridges formed at the inner and outer diameter parts of the magnet housing part 25. The inner and outer diameter parts may be formed in the magnet housing part 25 along the circumferential direction. The inner diameter part may indicate a part being in contact with the outer circumferential surface of the shaft 10, and the outer diameter part may indicate a part formed in the opposite direction of the inner diameter part.

The magnet housing part 25 may be formed so as to correspond to the size and shape of the magnet 30. The first to third rotor cores 21 to 23 may include the magnet housing parts 25 having the same size and formed at the same positions. In the drawings, reference numerals 26a and 26b represent bridges, and reference numerals 27a and 27b represent non-bridges at which no bridges are formed. Furthermore, a may indicate that the bridges are formed at the inner diameter parts of the respective rotor cores 21 to 23, and b may indicate that the bridges are formed at the outer diameter parts of the respective rotor cores 21 to 23.

The first rotor core 21 may be arranged at the center, top, and bottom of the shaft 10. The center may indicate the center in the longitudinal direction of the shaft 10. The second rotor core 22 may be arranged between the first rotor core 21 arranged at the center of the shaft 10 and the first rotor core 21 arranged at the top of the shaft 10, and arranged between the first rotor core 21 arranged at the center of the shaft 10 and the first rotor core 21 arranged at the bottom of the shaft 10. The third rotor core 23 may be arranged between the first rotor core 21 arranged at the center of the shaft 10 and the second rotor core 22 arranged over the first rotor core 21, and arranged between the first rotor core 21 arranged the center of the shaft 10 and the second rotor core 22 arranged under the first rotor core 21.

The rotor in accordance with the embodiment of the present invention may include three first rotor cores 21, two second rotor cores 22, and two third rotor cores 23. However, the present invention is not limited to the numbers.

In the rotor cores 21 to 23, since magnetic flux leaks through the bridges 26a and 26b, the parts at which the bridges 26a and 26b are formed may have a high magnetic flux density. Thus, the bridges 26a and 26b may generate a low torque because a large leakage flux occurs in the bridges 26a and 26b. However, the parts at which the bridges 26a and 26b are formed may effectively transmit a rotational force to the shaft 10. Thus, the bridges 26a and 26b may generate a low torque because the bridges 26a and 26b have a large leakage flux. Since the inner bridge 26a is in contact with the shaft 10, a rotational force may be easily transmitted to the shaft 10. The outer bridge 26b may serve to prevent the magnet from flying apart.

Since no magnetic flux leaks through the non-bridges 27a and 27b at which the bridges 26a and 26b are not formed, the non-bridges 27a and 27b may have a low magnetic flux density. At the inner non-bridge 27a, however, a rotational force may not be reliably transmitted to the shaft 10. Thus, the non-bridges 27a and 26b may generate a high torque because a small leakage flux occurs in the non-bridges 27a and 26b. In the embodiment of the present invention, the outer non-bridge 27b may not be completely opened, but a bridge may be partially formed to prevent the magnet 30 from flying apart.

Since the first rotor core 21 has the most excellent rotational force transmission function and flying prevention function among the first to third rotor cores 21 to 23, the first rotor core 21 may be formed at the center, top, and bottom of the shaft 10.

In the embodiment of the present invention, the first to third rotor cores 21 to 23 may be combined to effectively transmit a rotational force to the shaft 10 while improving the output density.

Regardless of whether the bridges 26a and 26b and the non-bridges 27a and 27b are formed, the thicknesses of the first to third rotor cores 21 to 23 may be set to different values, thereby optimizing the torque transmission and minimizing the leakage flux.

The third rotor core 23 may have a larger thickness than the second rotor core 22, and the second rotor core 22 may have a larger thickness than the first rotor core 21. Since the first rotor core 21 has the bridges 26a and 26b formed at the inner and outer diameters of the magnet housing part 25, the first rotor core 21 may have the largest leakage flux and generate a low torque. Thus, the first rotor core 21 may be formed to the smallest thickness among the first to third rotor cores 21 to 23. Since the third rotor core 23 has the non-bridges 27a and 27b formed at both of the inner and outer diameter parts of the magnet housing part 25, the third rotor core 23 may have the smallest magnetic leakage and generate a high torque. Thus, the third rotor core 23 may be formed to the largest thickness among the first to third rotor cores 21 to 23.

Figure 6A:
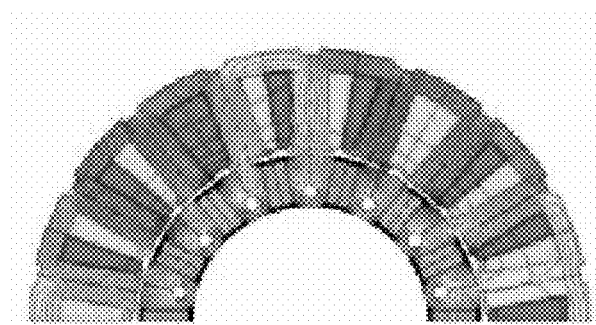
FIGS. 6A to 6F are analysis diagrams illustrating a magnetic flux path when no load is applied to the rotor cores in accordance with the embodiment of the present invention.
Figure 6B:
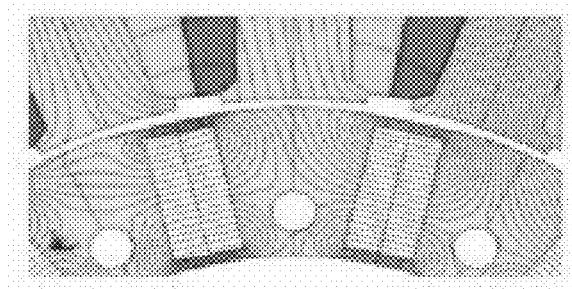
Figure 6C:
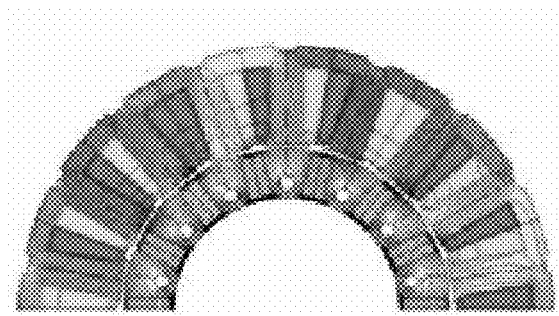
Figure 6D:
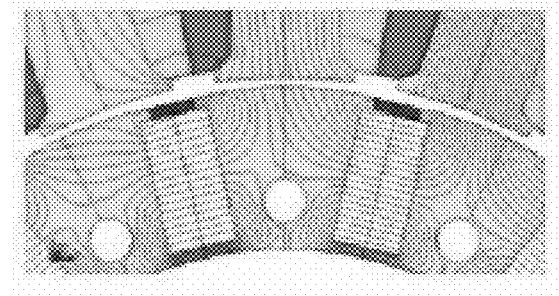
Figure 6E:
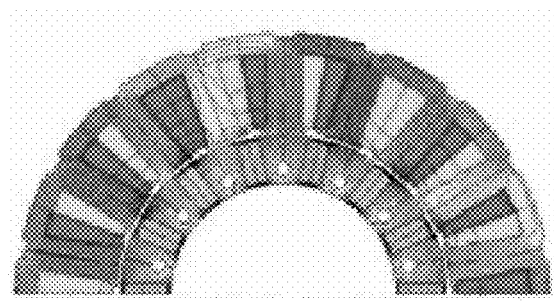
Figure 6F:
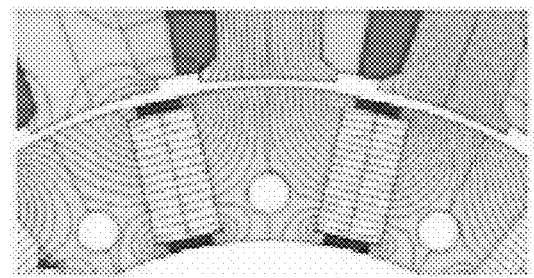

FIGS. 6A to 6F illustrate magnetic flux paths of the first to third rotor cores 21 to 23, respectively, when no load is applied. FIG. 6A illustrates a magnetic flux path in a half of the first rotor core 21 when no load is applied, and FIG. 6B is a partially expanded view of FIG. 6A. FIG. 6C illustrates a magnetic flux path in a half of the second rotor core 22 when no load is applied, and FIG. 6D is a partially expanded view of FIG. 6C. FIG. 6E illustrates a magnetic flux path in a half of the third rotor core 23 when no load is applied, and FIG. 6F is a partially expanded view of FIG. 6E.

Since the first rotor core 21 has the bridges 26a and 26b formed at the inner and outer diameter parts of the magnet housing part 25, a leakage flux may occur through the bridges 26a and 26b. Thus, the first rotor core 21 may have a small torque density because a large leakage flux occurs. Since the second rotor core 22 has the bridge 26a formed at the inner diameter part of the magnet housing part 25, a leakage flux may occur at the bridge 26a of the inner diameter part. Since the non-bridges 27a and 27b exist at the inner and outer diameter parts of the magnet housing part 25 in the third rotor core 23, the third rotor core 23 may have a smaller leakage flux than the first and second rotor cores 21 and 22.

Referring to FIGS. 1 and 2, an assembly process of the rotor in accordance with the embodiment of the present invention will be described.

First, the plurality of first to third rotor cores 21 to 23 may be combined and stacked. The first to third rotor cores 21 to 23 may be stacked in order of the first rotor core 21, the second rotor core 22, the third rotor core 23, the first rotor core 21, the third rotor core 23, the second rotor core 22, and the first rotor core 21 from the bottom to the top. At this time, the first to third rotor cores 21 to 23 may be arranged in such a manner that the magnet housing parts 25 and the through-holes 29 are located at the same positions. The first to third rotor cores 21 to 23 may be provisionally fastened through an embossing structure.

The fastening members 40 may be inserted into the through-holes 29 formed in the first to third rotor cores 21 to 23. At this time, since both ends of the fastening members 40 are rivet-fastened, the first to third rotor cores 21 to 23 may be integrated with each other.

The magnets 30 may be inserted into the magnet housing parts 25 formed in the first to third rotor cores 21 to 23. At this time, the magnets 30 may be bonded and fixed to the magnet housing parts 25 of the first to third rotor cores 21 to 23.

The shaft 10 may be installed into the centers of the first to third rotor cores 21 to 23. At this time, since the shaft 10 has the serration parts 12 formed on the outer circumferential surface thereof, slips of the first to third rotor cores 21 to 23 coupled to the shaft 10 may be prevented. Since the first to third rotor cores 21 to 23 have a smaller inner diameter than the outer diameter of the shaft 10, the slips of the first to third rotor cores 21 to 23 may be prevented by the serration parts 12, while the first and second rotor cores 21 to 23 are forced onto the shaft 10.

Alternatively, the first to third rotor cores 21 to 23 may have serration parts formed on the inner circumferential surfaces thereof, in order to prevent slips between the shaft 10 and the first to third rotor cores 21 to 23.

In accordance with the embodiment of the present invention, the plurality of rotor cores 21 to 23, which have different structures depending on whether the bridges 26a and 26b are formed, may be stacked and installed, thereby minimizing the leakage flux of the rotor and improving the output density of the motor.

Next, the structure of the rotor cores 21a to 23a when the shaft 10a includes a ferromagnetic material will be described as follows.

Figure 7:
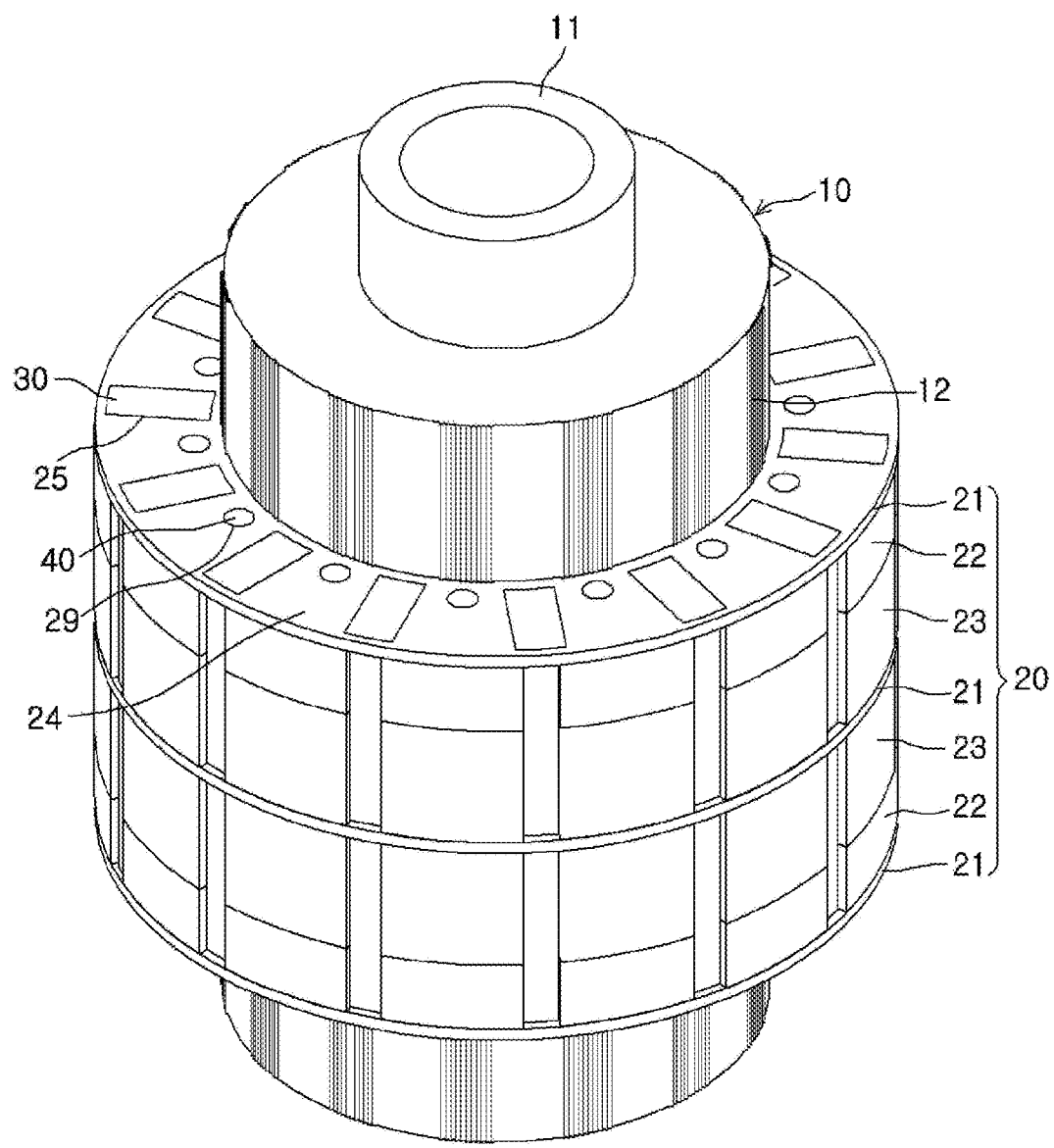
FIG. 7 is a schematic perspective view of a rotor in accordance with another embodiment of the present invention.
Figure 8:
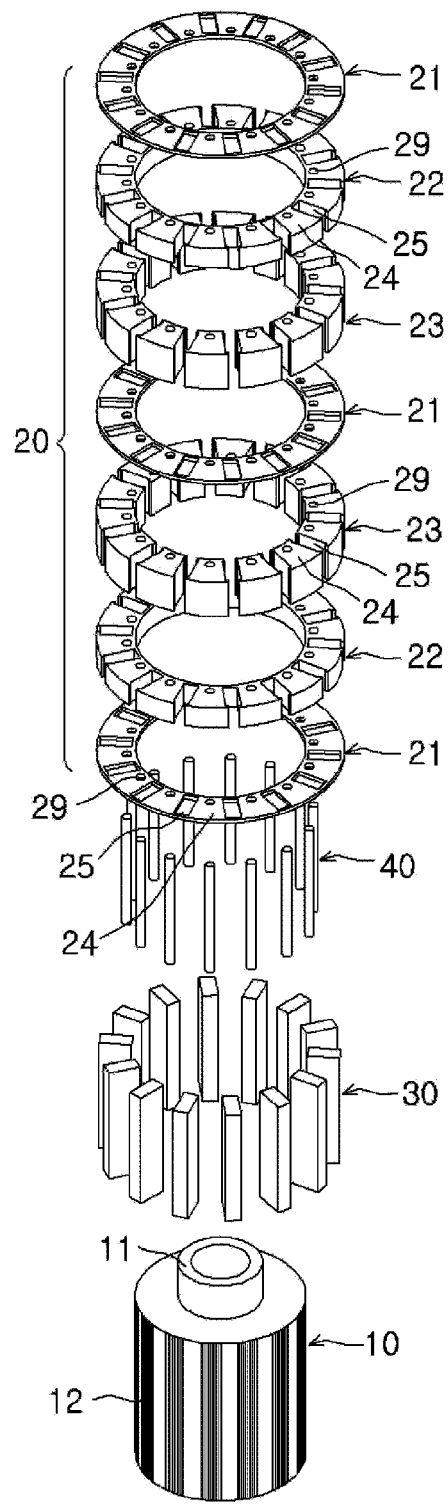
FIG. 8 is a schematic exploded perspective view of the rotor in accordance with the embodiment of the present invention.
Figure 9:
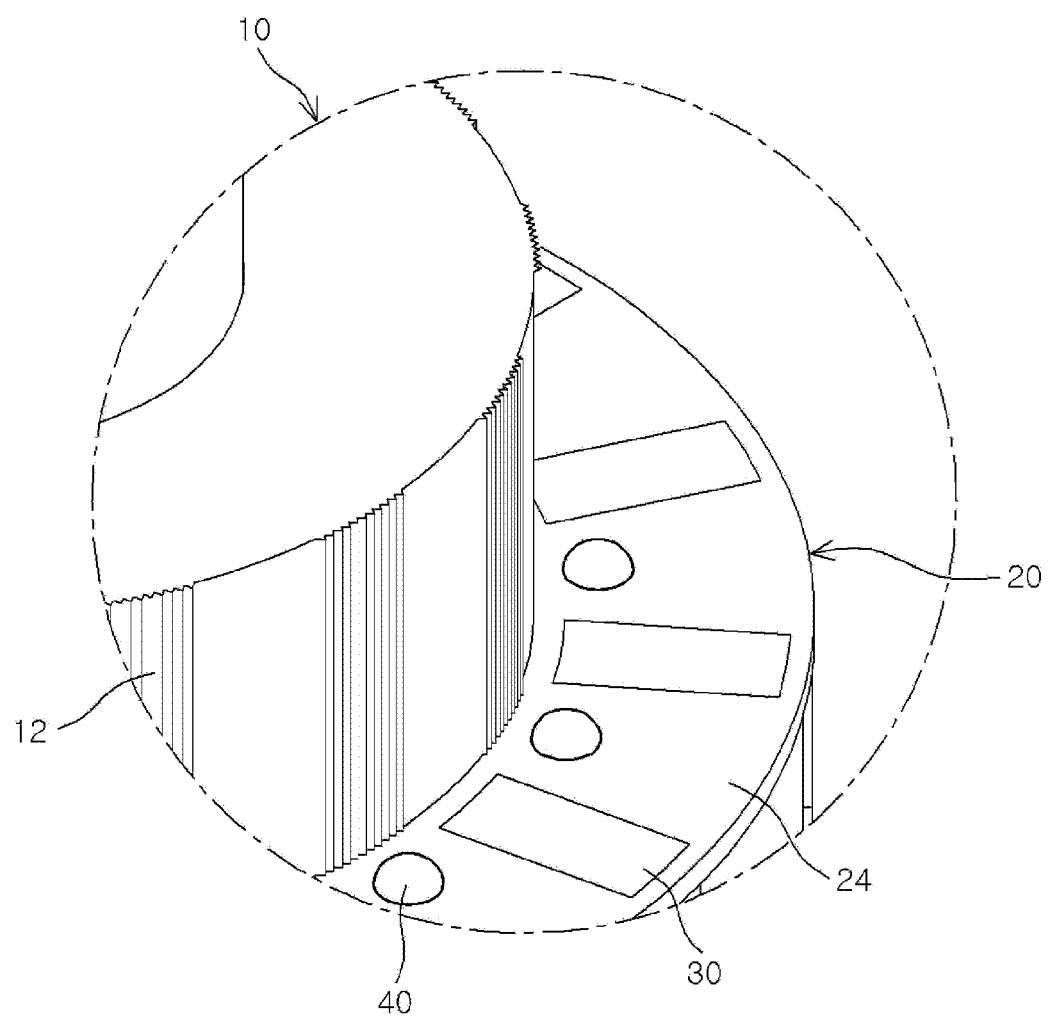
FIG. 9 is a partially expanded view illustrating the rotor in accordance with the embodiment of the present invention.
Figure 10A:
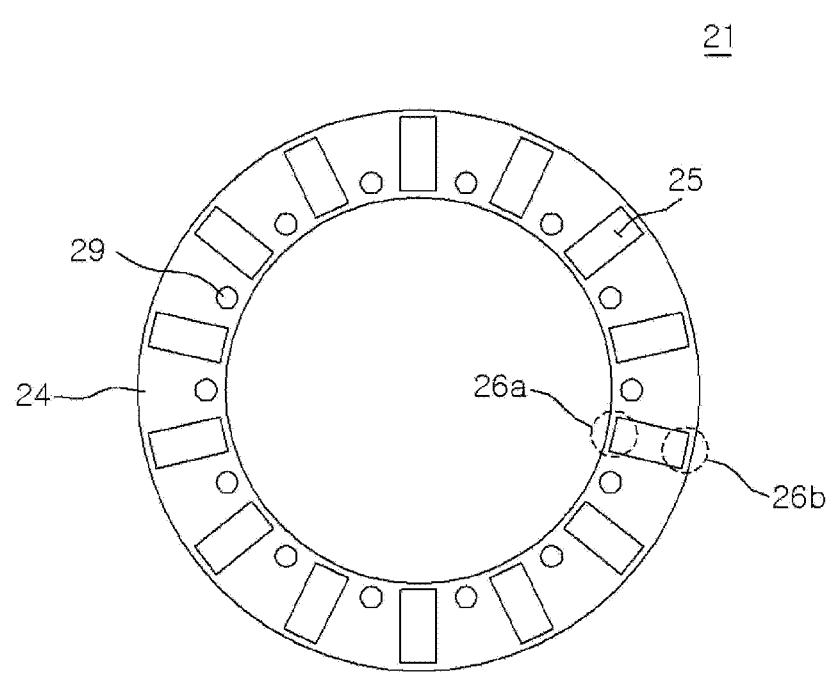
FIGS. 10A to 10C are schematic plan views of the rotor core in accordance with the embodiment of the present invention.
Figure 10B:
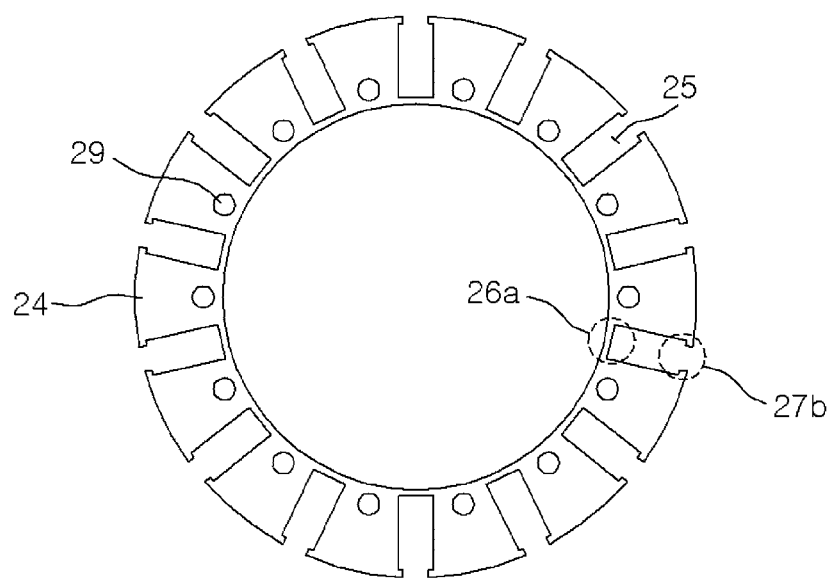
Figure 10C:
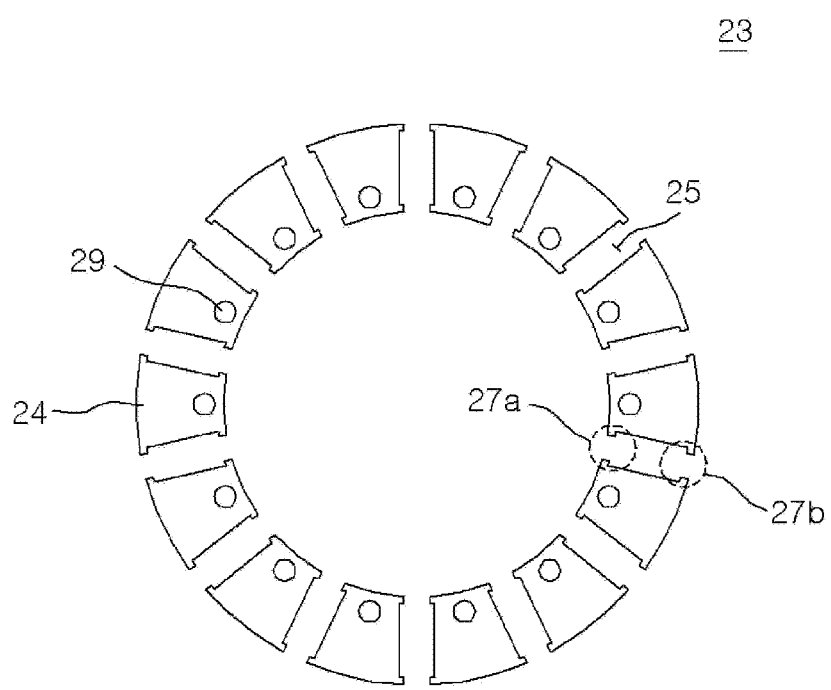

FIG. 7 is a schematic perspective view of a rotor in accordance with another embodiment of the present invention. FIG. 8 is a schematic exploded perspective view of the rotor in accordance with the embodiment of the present invention. FIG. 9 is a partially expanded view illustrating the rotor in accordance with the embodiment of the present invention. FIGS. 10A to 10C are schematic plan views of the rotor core in accordance with the embodiment of the present invention. FIG. 11 is a diagram illustrating magnetic flux saturation distributions of a first rotor core in accordance with the embodiment of the present invention.

Referring to FIGS. 7 and 8, the rotor in accordance with the embodiment of the present invention may include a shaft 10a, a rotor core assembly 20a, a magnet 30a, and a fastening member 40a.

The shaft 10a may be formed in a rod shape having a circular cross-section, and include a plurality of first to third rotor cores 21a to 23a coupled to the outer circumferential surface thereof. The shaft 10a may be rotated together with the first to third rotor cores 21a to 23a. The shaft 10a may include a hollow rotating shaft 11a into which a separate mechanical structure is inserted. The shaft 10a may include a ferromagnetic material. The ferromagnetic material refers to a material which has a large relative permeability and exhibits a hysteresis characteristic for magnetization. The ferromagnetic material may include elements such as Fe, Co, and Ni or an alloy thereof. In the present embodiment, the shaft 10a may be formed of a ferromagnetic material including chrome-molybdenum steel or carbon steel (SM45C) having a carbon content of 0.45%. In another embodiment of the present invention, the shaft 10a may include a non-magnetic material. As the non-magnetic material, the shaft 10a may include stainless steel or high manganese steel.

The rotor core assembly 20a may be forced onto the shaft 10a, and include a plurality of rotor cores 21a to 23a stacked therein. Each of the rotor cores 21a to 23a may have a hole formed in the center thereof such that the shaft 10a can be installed into the hole.

In the present embodiment, the rotor cores 21a to 23a may include a first rotor core 21a, a second rotor core 22a, and a third rotor core 23a. Each of the first to third rotor cores 21a to 23a may include a plurality of slits 24a and a magnet housing part 25a formed between the respective slits 24a so as to provide a space for housing the magnet 30a. The first to third rotor cores 21a to 23a may be formed in different shapes depending on whether bridges 26c and 26d for closing the inner and outer diameter parts of the magnet housing part 25a are formed. The plurality of first to third rotor cores 21a to 23a may be coupled to the shaft 10a.

Referring to FIGS. 7 to 9, the shaft 10a may have a plurality of serration parts 12a formed at a predetermined interval on the outer circumferential surface thereof. The serration parts 12a may be formed through a serration process which is performed along the longitudinal direction of the shaft 10a. The serration part 12a formed on the outer circumferential surface of the shaft 10a may have a triangular serration cross-section. The first to third rotor cores 21a to 23a may be forced onto the shaft 10. The serration parts 12a may be formed to deviate from the positions at which the magnets 30a are arranged in the first to third rotor cores 21a to 23a. That is, the serration parts 12a may be formed to face the respective slits 24 of the first to third rotor cores 21a to 23a, at which the magnets 30a are not arranged. This is in order to prevent the damage of the parts of the first to third rotor cores 21a to 23a, at which the magnets 30a are arranged, due to the contact with the serration parts 12a, when the first to third rotor cores 21a to 23a are forced onto the shaft 10a.

When the serration parts 12a are formed on the outer circumferential surface of the shaft 10a, the serration parts 12a may prevent the occurrence of slips between the first to third rotor cores 21a to 23a and the shaft 10a, while the first to third rotor cores 21a to 23a are rotated at the maximum torque with the shaft 10a. In the embodiment of the present invention, the serration parts 12a are formed on the outer circumference of the shaft 10a. However, the present invention is not limited, but the serration parts 12a may be formed at the inner diameter parts of the respective rotor cores 21a to 23a.

The magnet 30a may include a hexahedral permanent magnet. The magnet 30a may be inserted into the magnet housing part 25a, and fixed to the magnet housing part 25a through bonding. The magnet 30a may include an alnico magnet, a ferrite magnet, a rare earth magnet, a Mn—Al—C magnet and the like. In the embodiment of the present invention, a rare earth magnet having a high energy density may be applied as the magnet 30a.

Referring to FIGS. 7 and 8, the fastening member 40a may connect the first to third rotor cores 21a to 23a through through-holes 29a formed in the first to third rotor cores 21a to 23a. Since the bridges 26c and 26d are not formed in the third rotor core 23a, there is no part capable of connecting the entire third rotor core 23a. Thus, the respective slits 24a may be separated from each other. The third rotor core 23a may be connected to the first and second rotor cores 21a and 22a through the fastening members 40 such that the first to third rotor cores 21a to 23a may be integrated with each other. The fastening member 40a may include a non-magnetic material in order to have no influence on the magnetic force of the magnet 30a. In the embodiment of the present invention, the fastening member 40a may include stainless steel or high manganese steel.

Referring to FIG. 9, both ends of the fastening member 40 may be rivet-fastened to integrate the rotor core assembly 20a having the first to third rotor cores 21a to 23a stacked therein. Furthermore, the rivet-fastened fastening member 40a may prevent the first to third rotor cores 21a to 23a stacked on the shaft 10a from flying apart during rotation.

Referring to FIGS. 8 to 10, the first to third rotor cores 21a to 23a will be described in more detail.

The first rotor core 21a may have bridges 26c and 26d formed at the inner and outer diameter parts of the magnet housing part 25a, respectively, the second rotor core 22a may have a bridge 26c formed at the inner diameter part of the magnet housing part 25a, and the third rotor core 23a may have no bridges formed at the inner and outer diameter parts of the magnet housing part 25a. The inner and outer diameter parts may be formed in the magnet housing part 25a along the circumferential direction. The inner diameter part may indicate a part being in contact with the outer circumferential surface of the shaft 10a, and the outer diameter part may indicate a part formed in the opposite direction of the inner diameter part.

The first and second rotor cores 21a and 22a may have leakage flux prevention parts 25b which are opened to both sides of the magnet housing part 25a. The leakage flux prevention parts 25b may be formed at a side facing the inner diameter part of the magnet housing part 25a. The leakage flux prevention parts 25b may prevent a leakage flux. Referring to FIG. 11, red color may indicate that the leakage flux increases, and blue color may indicate that leakage flux decreases.

The magnet housing part 25a may be formed so as to correspond to the size and shape of the magnet 30a. The first to third rotor cores 21a to 23a may include the magnet housing parts 25a having the same size and formed at the same positions. In the drawings, reference numerals 26c and 26d represent bridges, and reference numerals 27c and 27d represent non-bridges at which no bridges are formed. Furthermore, c may indicate that the bridges are formed at the inner diameter parts of the respective rotor cores 21a to 23a, and d may indicate that the bridges are formed at the outer diameter parts of the respective rotor cores 21a to 23a.

The first rotor core 21a may be arranged at the center, top, and bottom of the shaft 10a. The center may indicate the center in the longitudinal direction of the shaft 10a. The pair of second rotor cores 22a may be arranged to be separated from each other between the first rotor core 21a arranged at the center of the shaft 10a and the first rotor core 21a arranged at the top of the shaft 10a, and arranged to be separated from each other between the first rotor core 21a arranged at the center of the shaft 10a and the first rotor core 21a arranged at the bottom of the shaft 10a. The third rotor core 23a may be arranged between the pair of second rotor cores 22a arranged at the top of the shaft 10a, and arranged between the pair of second rotor cores 22a arranged at the bottom of the shaft 10a.

The rotor in accordance with the embodiment of the present invention may include three first rotor cores 21a, four second rotor cores 22a, and two third rotor cores 23a. However, the present invention is not limited to the numbers.

In the rotor cores 21a to 23a, since a leakage flux occurs through the bridges 26c and 26d, the parts at which the bridges 26c and 26d are formed may have a high magnetic flux density. Thus, the bridges 26c and 26d may generate a low torque because a large leakage flux occurs in the bridges 26c and 26d. However, the parts at which the bridges 26c and 26d are formed may effectively transmit a rotational force. Thus, the bridges 26c and 26d may generate a low torque because a large leakage flux occurs in the bridges 26c and 26d. Since the inner bridge 26c is in contact with the shaft 10a, a rotational force may be easily transmitted to the shaft 10. The outer bridge 26b may serve to prevent the magnet 30a from flying apart.

Since no magnetic flux leaks through the non-bridges 27c and 27d at which the bridges 26c and 26d are not formed, the non-bridges 27a and 27b may have a low magnetic flux density. At the inner non-bridge 27c, however, a rotational force may not be reliably transmitted to the shaft 10a. However, the non-bridges 27c and 26d may generate a high torque because a low leakage flux occurs in the non-bridges 27c and 26d. In the embodiment of the present invention, the outer non-bridge 27d may not be completely opened, but a bridge may be partially formed to prevent the magnet 30a from flying to the outside.

Since the first rotor core 21a has the more excellent rotational force transmission function and flying prevention function among the first to third rotor cores 21 to 23a, the first rotor core 21a may be formed at the center, top, and bottom of the shaft 10a.

In the embodiment of the present invention, the first to third rotor cores 21a to 23a may be combined to effectively transmit a rotational force to the shaft 10a while improving the output density.

Regardless of whether the bridges 26c and 26d and the non-bridges 27c and 27d are formed, the thicknesses of the first to third rotor cores 21a to 23a may be se to different values, thereby optimizing the torque transmission and minimizing the leakage flux.

The third rotor core 23a may have a larger thickness than the second rotor core 22a, and the second rotor core 22a may have a larger thickness than the first rotor core 21a. Since the first rotor core 21a has the bridges 26a and 26b formed at the inner and outer diameters of the magnet housing part 25a, the first rotor core 21 may have the largest leakage flux and generate a low torque. Thus, the first rotor core 21a may be formed to the smallest thickness among the first to third rotor cores 21a to 23a. Since the third rotor core 23a has the non-bridges 27a and 27b formed at both of the inner and outer diameter parts of the magnet housing part 25a, the third rotor core 23a may have the smallest magnetic leakage and generate a high torque. Thus, the third rotor core 23a may be formed to the largest thickness among the first to third rotor cores 21a to 23a.

In the embodiment of the present invention, the second rotor core 22a formed at the center of the shaft 10a may have a smaller thickness than the second rotor core 22a formed outside the shaft 10a.

At the outer diameter part of the second rotor core 22a, a magnet support part 25c may be formed to protrude. The magnet support part 25c may serve to prevent coming-off of the magnet 30a. The second rotor core 22a may have the non-bridge 27a formed at the outer diameter part thereof. However, the magnet support part 25c for supporting the magnet 30a may be formed to protrude, thereby preventing coming-off of the magnet while stably supporting the rotating magnet.

FIG. 11 is a diagram illustrating flux saturation distributions of the first rotor core. Since the first rotor core 21a has the bridges 26c and 26d formed at the inner and outer diameter parts of the magnet housing part 25a, respectively, a leakage flux may occur through the bridges 26c and 26d. Thus, the first rotor core 21a may have a small torque density because a large leakage flux occurs in the first rotor core 21a. However, the leakage flux prevention parts 25b may prevent the occurrence of leakage flux. Since the second rotor core 22a has the bridge 26c formed at the inner diameter part of the magnet housing part 25a, a leakage flux may occur at the bridge 26c of the inner diameter part. In the second rotor core 22a, the leakage flux prevention parts 25b may also prevent the occurrence of leakage flux. Since the third rotor core 23a has no bridges formed at the inner and outer diameter parts of the magnet housing part 25a but has the non-bridges 27c and 27d, the third rotor core 23a has a smaller leakage flux than the first and second rotor cores 21a and 22a. Thus, in the embodiment of the present invention, a ferromagnetic material may be applied as the shaft 10a adjacent to the leakage flux prevention part 25b.

Referring to FIGS. 7 and 8, an assembly process of the rotor in accordance with the embodiment of the present invention will be described as follows.

First, the plurality of first to third rotor cores 21a to 23a may be combined and stacked. The first to third rotor cores 21a to 23a may be stacked in order of the first rotor core 21a, the second rotor core 22a, the third rotor core 23a, the second rotor core 22a, the first rotor core 21a, the second rotor core 22a, the third rotor core 23a, the second rotor core 22a, and the first rotor core 21a from the bottom to the top. At this time, the first to third rotor cores 21a to 23a may be arranged in such a manner that the respective magnet housing parts 25a and the respective through-holes 29a thereof are located at the same positions. The first to third rotor cores 21a to 23a may be provisionally fastened through an embossing structure.

The fastening members 40 may be inserted through the through-holes 29a formed in the first to third rotor cores 21a to 23a. At this time, since both ends of the fastening members 40 are rivet-fastened, the first to third rotor cores 21a to 23a may be integrated with each other.

The magnets 30a may be inserted into the magnet housing parts 25a formed in the first to third rotor cores 21a to 23a. At this time, the magnets 30a may be bonded and fixed to the magnet housing parts 25a of the first to third rotor cores 21a to 23a.

The shaft 10a may be inserted into the centers of the first to third rotor cores 21a to 23a. At this time, since the shaft 10a has the serration parts 12a formed on the outer circumferential surface thereof, slips of the first to third rotor cores 21a to 23a coupled to the shaft 10 may be prevented. Since the first to third rotor cores 21a to 23a have a smaller inner diameter than the outer diameter of the shaft 10a, the slips of the first to third rotor cores 21a to 23a may be prevented by the serration parts 12a, while the first and second rotor cores 21a to 23a are forced onto the shaft 10a.

Alternatively, the first to third rotor cores 21a to 23a may have serration parts formed on the inner circumferential surfaces thereof, in order to prevent slips between the shaft 10a and the first to third rotor cores 21a to 23a.

In accordance with the embodiment of the present invention, the plurality of rotor cores 21a to 23a, which have different structures depending on whether the bridges 26c and 26d are formed, may be stacked and installed, thereby minimizing the leakage flux of the rotor and improving the output density of the motor.

In accordance with the embodiments of the present invention, the rotor may minimize a leakage flux, thereby improving the output density of the motor.

Furthermore, as a leakage flux is minimized, the material cost of the permanent magnets and the rotor cores can be reduced under the same output condition.

Furthermore, since the rotor does not require a separate molding process for preventing the permanent magnets and the rotor cores from flying apart during high-speed rotation, the operation process can be simplified and the productivity can be improved.

Furthermore, the serration parts formed on the shaft may prevent slips between the rotor cores and the shaft, even though the torque of the motor increases.

Furthermore, it is possible to provide the rotor core structure which can be applied to the shaft including a ferromagnetic material.

Although embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A rotor comprising:
   a shaft extending along a rotational axis;
   a rotor core assembly comprising a plurality of rotor core plates stacked along the rotational axis and a plurality of magnets, each rotor core plate comprising a plurality of sections angularly arranged about the rotational axis and defining a magnet insertion space between two immediately neighboring sections such that each of the plurality of magnets is inserted through a channel formed by the magnet insertion spaces of the stacked rotor core plates, the plurality of rotor core plates comprising a first rotor core plate, a second rotor core plate and a third rotor core plate, wherein each section in each rotor core plate having an inner edge and an outer edge,
   wherein in the first rotor core plate, inner edges of two immediately neighboring sections are connected with a first inner bridge and also outer edges of the two immediately neighboring sections are connected with a first outer bridge
   wherein in the second rotor core plate, inner edges of two immediately neighboring sections are connected with a second inner bridge and also no bridge is provided for connecting outer edges of the two immediately neighboring sections
   wherein in the third rotor core plate, no bridge is provided for connecting inner edges of the two immediately neighboring sections and also no bridge is provided for connecting outer edges of the two immediately neighboring sections
   wherein the third rotor core plate is thicker than the second rotor core plate along the rotational axis, and the second rotor core plate is thicker than the first rotor core plate along the rotational axis.

2. The rotor of claim 1, wherein
   the third rotor core plate is arranged between the first rotor core plate and the second rotor core plate.

3. The rotor of claim 1, wherein the shaft has serration parts formed on an outer circumferential surface thereof along a longitudinal direction thereof.

4. The rotor of claim 3, wherein the serration parts are formed to face the respective slits of the first to third rotor cores.

5. The rotor of claim 1, wherein each of the plurality of sections comprises a through hole configured to receive a fastening member therethrough.

6. The rotor of claim 5, further comprising a fastening member inserted through the through hole to connect the plurality of rotor core plates.

7. The rotor of claim 1, wherein the shaft comprises a ferromagnetic material.

8. The rotor of claim 1, wherein the second rotor core plate has a magnet support part protruding from an outer diameter part thereof, the magnet support part configure to prevent coming-off of a magnet from the magnet insertion space.

9. The rotor of claim 3, wherein the serration parts are formed to face the respective slits of the first to third rotor cores.

\* \* \* \* \*